(12) United States Patent
Lindwer

(10) Patent No.: US 6,349,377 B1
(45) Date of Patent: *Feb. 19, 2002

(54) PROCESSING DEVICE FOR EXECUTING VIRTUAL MACHINE INSTRUCTIONS THAT INCLUDES INSTRUCTION REFEEDING MEANS

(75) Inventor: Menno M. Lindwer, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/161,848

(22) Filed: Sep. 28, 1998

(30) Foreign Application Priority Data

Oct. 2, 1997 (EP) .............................. 97203033

(51) Int. Cl.[7] ............................. G06F 9/45; G06F 9/30; G06F 9/72
(52) U.S. Cl. ............................. 712/22; 712/22; 712/41; 717/5
(58) Field of Search .............................. 717/5; 712/212, 712/41, 23; 705/9

(56) References Cited

U.S. PATENT DOCUMENTS 5,577,295 A * 11/1996 Alferness et al. ............. 712/41
5,925,123 A * 7/1999 Tremblay et al. ........... 712/212
6,009,405 A * 12/1999 Leymann et al. ............... 705/9
6,021,273 A * 2/2000 Griesemer ..................... 717/5

OTHER PUBLICATIONS

"A Prolog Preprocessor For Warren's Abstract Instruction Set" by B. Knodler and W. Rosentiel, Microprocessing and Microprogramming 18 (1986) pp. 71–81.
Eddy H. DaBaere et al, "Interpretation and Instruction Path Coprocessing", The MIT Press 1990, pp. 112–117, 129–146, 163–165.

* cited by examiner

*Primary Examiner*—Thomas Black
*Assistant Examiner*—Te Yu Chen

(57) ABSTRACT

A processing device is disclosed that includes an instruction memory for storing virtual machine instructions, such as Java byte codes. A processor of the processing device includes a predetermined microcontroller core for executing native instructions from a predetermined set of microcontroller specific instructions. The native instructions differ from the virtual machine instructions. The processor may request re-feeding of a plurality of native instructions. For instance, the processor may have a pipeline and/or instruction cache which after an interrupt needs to be re-filled. The processing device includes a pre-processor with a converter for converting at least one virtual machine instruction, fetched from the instruction memory, into at least one native instruction. A feeding means of the pre-processor feeds native instructions to the microcontroller core and re-feeds native instructions in response to the processor requesting re-feeding of a number of native instructions.

14 Claims, 4 Drawing Sheets

PROCESSING DEVICE FOR EXECUTING VIRTUAL MACHINE INSTRUCTIONS THAT INCLUDES INSTRUCTION REFEEDING MEANS

FIELD OF THE INVENTION

The invention relates to a processing device for executing virtual machine instructions; the processing device comprising: an instruction memory for storing instructions including at least one of the virtual machine instructions; a microcontroller comprising a processor comprising a predetermined microcontroller core for executing native instructions from a predetermined set of microcontroller specific instructions; the native instructions being different from the virtual machine instructions; and a pre-processor comprising: a converter for converting at least one virtual machine instruction, fetched from the instruction memory into at least one native instruction; and feeding means for feeding native instructions to the microcontroller core for execution.

The invention further relates to a pre-processor for use with a microcontroller comprising a processor comprising a predetermined microcontroller core for executing native instructions from a predetermined set of microcontroller specific instructions;

the pre-processor comprising: a converter for converting at least one virtual machine instruction, fetched from an instruction memory, into at least one native instruction; the native instructions being different from the virtual machine instructions; and feeding means for feeding native instructions to the microcontroller core for execution.

Increasingly, source programs are expressed in (compiled to) instructions of a virtual machine instead of native instructions of a microcontroller on which the program is to be executed. A main reason for using a virtual machine is portability of programs between different machines (platforms). A program expressed in the virtual machine instructions of the virtual machine can be executed relatively easily on several concrete machines, using suitable interpreters operating on those machines. At this moment a driving force for using portable programs is Java, where Java programs (referred to as applets) are exchanged via Internet and can be executed on different native machines using processors with different instruction sets. Using a compiler, Java applets are expressed in Java byte codes (JBCs), which form the instructions of the Java Virtual Machine. For embedded applications, a further driving force for using virtual machines is the need for compact code. As the size of software continuously grows, software compression techniques which, due to a certain initial costs, where not attractive before become feasible. One of such techniques is to choose a suitable virtual machine for a specific embedded application, such that the program can be expressed more compactly in the virtual machine instructions than in the native instructions. An example of such a virtual machine is a stack machine, which is known for its compact representation. A specific virtual machine for an embedded application can be defined by first expressing the source program in virtual machine instructions of a chosen virtual machine, such as a stack machine, and additionally, replacing sequences of virtual machine instructions which occur frequently in the compiled code by newly defined additional virtual machine instructions, where, for instance, one new instruction replaces a sequence of four existing instructions.

Conventionally, programs expressed in virtual machine instructions are executed by means of software interpretation. The processor (CPU) executes a special interpreter program, where in a loop the processor fetches a virtual machine instruction, decodes it into a sequence of native instructions of the microcontroller core of the processor and executes each native instruction. This technique is slow and requires an additional interpreter program, which can be relatively large. To improve the execution speed, the so-called Just-In-Time (JIT) compilation technique is used. Just before starting execution of software module expressed in virtual machine instructions, the module is compiled to native code (expressed in native machine instructions). In this way, the module needs to be stored twice in addition to the code for the compiler. The additional storage requirements of software interpretation are not desired for embedded systems. Instead it is preferred to use a hardware interpreter. In itself a hardware interpreter is known in the form of a Prolog pre-processor for Warren's abstract instruction set. In the paper "A Prolog pre-processor for Warren's abstract instruction set" by B. Knödler and W. Rosenstiel, Microprocessing and Microprogramming 18 (1986) pages 71–81, a pre-processor is described for interpreting programs written in the Prolog programming language on a Motorola 68000 processor (MC68000). A compiler is used to translate the Prolog source program into instructions, which have been defined by Mr. Warren and which are generally used for executing Prolog programs. The set of Warren instructions forms a virtual machine designed for executing Prolog programs. The sequence of Warren instructions resulting from the compilation are executed by the MC68000 with the aid of the pre-processor. After power-on, the MC68000 first performs a booting procedure by executing native MC68000 instructions. At the end of the booting procedure, the MC68000 is ready to initiate the execution of a Prolog program. This is started by jumping to a predetermined address range. The pre-processor is a memory-mapped device, which is mapped to this range. When the pre-processor is addressed it reads a Warren instruction (of the translated Prolog program) from its own RAM, adaptively synthesizes a sequence of MC68000 instructions and constants and sends these directly to the CPU for execution. The MC68000 instructions for each Warren instruction are stored in ROM of the pre-processor. In general, the pre-processor translates one Warren instruction into a sequence of MC68000 instructions. The pre-processor contains its own RAM controller and ROM controller, which generate the addresses for the RAM and ROM of the pre-processor. The RAM controller manages the RAM instruction pointer. Each successive read operation of the MC68000 results in the pre-processor sending the next instruction (and optional constants) of the sequence to the CPU. If the sequence has been completed, a next read operation results in the first instruction of the sequence corresponding to the next Warren instruction of the program being send to the CPU. After an interrupt, a repeated read operation of the CPU results in re-sending the last instruction (and optional constants).

SUMMARY OF THE INVENTION

It is an object of the invention to provide a processor device of the kind set forth which is suitable for use with a microcontroller which contains more than one instruction at a time.

To achieve the object, the processor is of a type which after the occurrence of a predetermined condition, such as an interrupt, requests re-feeding of up to a predetermined maximum of n native instructions, where n>1; and the feeding means comprises means for in response to the processor requesting re-feeding of a number of native instructions, re-feeding the requested native instructions. The inventor has realised that modern processors can comprise several native instructions at a time, where the execution of the instruction has not yet begun or has not yet been completed, and that in order to increase performance it is desired to exploit the capabilities of the processor of containing more than one instruction. The inventor had the insight that in order to cope with the situation in which the processor discards at least some of the already loaded instructions and at a later stage requests re-feeding of several instructions (e.g. on the occurrence of certain conditions, such as an interrupt), a re-feeding mechanism is required for re-feeding the requested native instructions to the processor.

According to one embodiment, the pre-processor comprises a feeding memory, such as a FIFO, for storing last fed instructions and re-feeding from the feeding memory, providing a simple and effective way of re-feeding the instructions. In view of the fact that in general a virtual machine instruction is converted to a sequence of more than one native instruction, the first native instruction to be re-fed may be any instruction of the sequence. Moreover, the native instruction may correspond to an earlier virtual machine instruction than the current one. Finally, the sequence length may be different for different virtual machine instructions. Using the feeding memory makes it possible to simply re-feed native instructions from the memory instead of retracing virtual machine instructions and the corresponding native instructions.

According to another embodiment, instructions being actively processed in the pipeline of the microcontroller can be re-fed. This makes the pre-processor particularly suitable for use in combination with a RISC-type processor which usually has a pipelined architecture.

According to another embodiment, instructions stored in the instruction cache of the processor can be re-fed. This makes the pre-processor particularly suitable for use in combination with modern processors, such as RISC-type processors, which usually have an instruction cache.

According to another embodiment, instruction stored in the cache or being processed in the pipeline can be re-fed.

According to another embodiment, the feeding memory is capable of storing, in addition to instructions which may need to be re-fed, also instructions which are to be fed for the first time. In this way the pre-processor may in advance generate native instructions before the native instruction is actually requested, avoiding possible delays in feeding a first time requested instruction to the processor. Moreover, it allows the use of only one feeding mechanism which takes care of feeding first time requested instructions and of re-feeding instructions.

One aspect of the invention is directed to a simple and effective way for unifying first time feeding and re-feeding. The instructions which have already been fed and the instruction(s) still to be fed are stored successively in the feeding memory, such as a FIFO. Logically the pre-processor maintains a pointer indicating a memory location in the feeding memory containing the instruction expected to be requested next (i.e. the first instruction which has not yet been requested before). In practice, this memory location may always be at a fixed position of the feeding memory, so that no separate pointer needs to be maintained. The pre-processor comprises a counter which indicates an address of the native instruction expected to be requested next by the processor for first time feeding. Normally, each time a native instruction has been fed for the first time, the counter is incremented. The processor indicates (using an instruction pointer) an address of the instruction required next by the processor. This may be a request for a first time feeding or a re-feeding of an instruction. The pre-processor compares the requested address to the address stored in the counter. Based on the offset, the instruction is located in the feeding memory. For instance, the counter may store the address of the instruction expected to be requested next, being one higher than the address of the instruction fed last. If indeed the processor requests this new instruction, the offset is zero. If the logical pointer points to the location of the new instruction, the instruction stored at this location is fed to the processor. If the processor requests re-feeding of the previous instruction, the offset may be one or minus one (counted in units of an instruction, which may be 4 counted in units of bytes for a 32-bit instruction). By subtracting (or respectively adding) the offset from the pointer the requested instruction is located. It will also be appreciated that the counter and the logical pointer do not need to store the exact address/location of the instruction expected to be requested next. For instance, the logical pointer may also indicate the last fed instruction.

Another aspect of the invention is directed to an alternative arrangement where no additional feeding memory is required. Instead the pre-processor stores state information which enable recreating the instructions requested by the processor for refeeding. As an example, instead of storing fed instructions in a feeding memory, also pointers indicating instructions or information used to initially create the instructions may be stored in a memory.

In one embodiment, part of the state is stored in the instruction pointer of the microcontroller, potentially reducing the costs of the pre-processor.

In another embodiment, the pre-processor comprises for at least one virtual machine instruction a corresponding translation table for translating the virtual machine instruction into a sequence of native instructions. The translation table may, for instance, be stored in ROM. The least significant part of the instruction pointer of the processor is used to indicate which of the native instructions in the table is required (i.e. the least-significant part of the instruction pointer acts as a translation table offset indicator). During normal operation, the processor automatically increments the instruction pointer. Advantageously, the pre-processor does not need to store an own counter and increment this counter for indicating the native instruction expected to be read next. If the processor requests a re-feeding, the processor will automatically set the instruction pointer to a previous value. In this way also re-feeding can be taken care of automatically.

The measure defined in dependent claim 11 provides an effective way for determining, in addition to the translation table offset, also the translation table in which the requested native instruction is located. A predetermined further part of the instruction pointer comprises a virtual machine instruction pointer indicating a virtual machine instruction in the instruction memory. This virtual machine instruction pointer can be seen as a virtual machine program counter, which needs to be incremented each time a new virtual machine instruction is required. The pre-processor fetches the virtual machine instruction indicated by the virtual machine instruction pointer from the instruction memory and based on the fetched virtual machine instruction locates the translation table. The least significant part of the instruction pointer of the processor is then used as an offset in the translation table. Whenever a sequence of native instructions relating to one virtual machine instruction has been completed, the virtual machine instruction pointer can be set to indicate the next virtual machine instruction, for instance, by using as a last native instruction in the sequence an explicit jump which sets the virtual machine instruction pointer to the desired value and resets the translation offset part of the instruction pointer or using one or more NOP (no operation) instructions so that eventually an overflow of the translation offset part results in the processor incrementing the virtual machine instruction pointer. It will be appreciated that it is not required that each request from the processor for an instruction results in fetching a virtual machine instruction from the instruction memory. Advantageously, the pre-processor comprises a cache for storing already fetched or expected to be fetched virtual machine instructions from the instruction memory.

Advantageously, as an alternative to a full native instruction the translation table contains a native instruction skeleton for at least native instructions with variable parts. The skeleton comprises predetermined fixed parts of the native instruction, such as the operation code, whereas variable elements of the instruction, such as certain operands, are loaded adaptively, for instance from parameters of the corresponding virtual machine instruction.

Another aspect of the invention provides an alternative for the use of the virtual machine instruction pointer. In this embodiment the translation table is divided into several sub-tables, at least one of the sub-tables comprising a sequence of native instructions or native instruction skeletons. A sub-table may but does not need to correspond to a complete sequence of native instructions corresponding to one virtual instruction. In practice it may be preferred to choose a sub-table size of only 4 or 8 native instructions, which may be less than the maximum sequence of native instructions for a virtual machine instruction. The translation table offset indicator indicates an offset in one of the sub-tables. A predetermined further part of the instruction pointer comprises a sub-table indicator. The pre-processor uses the value of the sub-table indicator to locate the actually involved sub-table. Preferably, in normal operation the sub-table indicator is incremented by one unit each time a native instruction is fetched from a next sub-table (regardless of the sub-table being related to the same or different virtual machine instructions). The pre-processor may store pointers to the related sub-table(s) for the last used sub-table indicators. Particularly for relatively small sub-tables, a sequence of native instructions relating to one virtual machine instruction may be complemented by NOP instructions in order to ensure that the sequence ends on a sub-table boundary (eliminating the use of jump operations to correct the value of the sub-table indicator part of the instruction pointer). Most processors can execute a NOP operation significantly faster than a jump operation.

The measure defined in the dependent claim 13 ensures that no deadlock situation can occur wherein the processor has requested an instruction and blocks the bus until the instruction has been supplied, whereas the pre-processor first needs to obtain a (virtual machine) instruction from the instruction memory via the same bus before it can supply the native instruction.

These and other aspects of the invention will be apparent from and elucidated with reference to the embodiments shown in the drawings.

DETAILED DESCRIPTION OF THE PREFERRED EMBODIMENTS

Figure 1A:
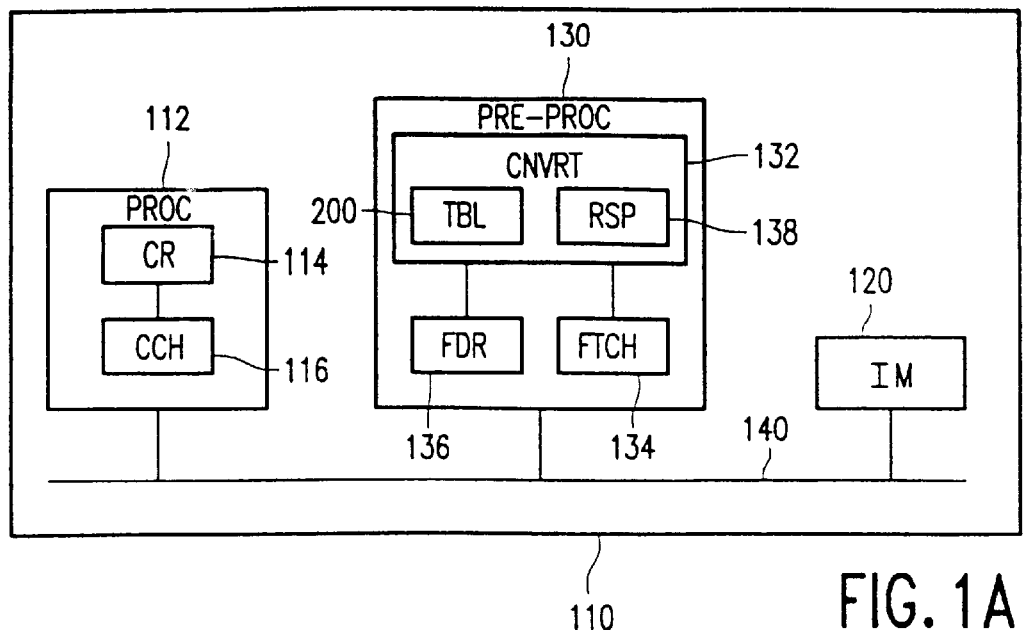
FIG. 1 illustrates four possible architectural options of locating the pre-processor in the processing device.

FIG. 1 illustrates four possible architectural options of locating the pre-processor in the processing device 100. Three main components of the processing device 100, are the microcontroller 110, the instruction memory 120 and the pre-processor 130. In all figures the microcontroller 110 comprises the instruction memory 120 and the pre-processor 130. The processing device 100 is not shown explicitly. By combining all main elements in the microcontroller 110, which preferably is a one-chip device, optimum performance can be achieved. It will be appreciated that, if desired, the instruction memory 120 and/or the pre-processor 130 may be located outside the microcontroller 110, where the microcontroller bus 140 is extended outside the microcontroller 110 and, for instance, coupled to an external bus such as PCI.

The instruction memory 120 contains virtual machine instructions, such as instructions for a stack machine, An example of such virtual machine instructions are Java byte-codes. The microcontroller 110 comprises a processor 112 with a predetermined microcontroller core 114, referred to as a native machine, for executing native instructions from a predetermined set of microcontroller specific instructions. An example of a microcontroller suitable for executing embedded software is a RISC-type microcontroller, like the MIPS PR3001 range of microprocessors. The native instructions of the microcontroller core 114 are different from the virtual machine instructions of the virtual machine. As such the microcontroller 110 is not able to directly execute virtual machine instructions stored in the instruction memory 120. In response to the processor 110 requesting an instruction, the pre-processor 130 issues the native instruction. In order to be able to generate the native instruction the pre-processor 130 may fetch a virtual machine instruction from the instruction memory 120 using fetching means 134. The pre-processor 130 comprises a converter 132 for converting a virtual machine instruction, fetched from the instruction memory 120, into at least one native instruction. In general, a virtual machine instruction is converted to a sequence of native instructions. The pre-processor 130 further comprises a feeding means 136 for feeding native instructions of the sequence to the microcontroller core for execution. When executing a virtual machine program the microcontroller 110 in fact executes a native program generated by the pre-processor 130. Where normally an instruction pointer of the microcontroller 110 indicates the next instruction in the instruction memory 120 required by the microprocessor 110 to be executed next, now the instruction pointer indicates to the pre-processor 130 that a next native instruction is required (or a re-feeding of a previous instruction). Logically, the pre-processor 130 manages an independent virtual machine instruction pointer indicating the current (or next) virtual machine instruction in the instruction memory 120. The microcontroller has no (explicit) knowledge of the virtual machine instruction or the virtual machine instruction pointer.

The processor 112 is of a type which after the occurrence of a predetermined condition requests re-feeding of up to a predetermined maximum of n native instructions, where n>1. Such a condition may be an interrupt, causing the processor to discard instructions already in the processor. A processor 112 with a k-stage pipelined will normally operate on k instructions at a time. The occurrence of the condition may result in discarding all k instructions. A further reason for discarding more than one instruction is where the processor comprises an instruction cache 116 for storing up to h instructions. The occurrence of the condition may result in discarding all h instructions in the cache 116. At a later stage, the processor 112 may return to the execution of the virtual machine program and request re-feeding of more than one instruction. To this end, the feeding means 136 comprises means for in response to the processor 112 requesting re-feeding of a number of native instructions, re-feeding the requested native instructions.

It will be appreciated that the instruction memory 120 may also contain native instructions. Such native instructions may for instance be used to initialise the system or to allow certain software modules, such as drivers or special parts of the embedded software application, to be compiled to native instructions for optimal performance. A distinction between native instructions and virtual machine instructions in the instruction memory 120 may be made on the address of the instruction, where a predetermined range of addresses is allocated for virtual machine instructions. Other alternatives include using a special bit for each instruction indicating whether the instruction is a native instruction or a virtual machine instruction; or using a special register which indicates the current type of instruction, where the content of the register needs to be changed each time a change of type occurs. The pre-processor 130 ensures that native instructions are passed from the instruction memory 120 to the processor 112 unmodified.

In FIG. 1A the main components of the processing device are interconnected via a general peripheral interconnect bus 140, such as the PI bus. The pre-processor 130 is a peripheral on the bus. The pre-processor 130 may act as a memory-mapped peripheral, where a predetermined range of addresses is allocated to the pre-processor. In response to the processor 110 issuing on the bus 140 a request for an instruction with an address in this range, the pre-processor 130 issues the native instruction on the bus 140. When required, the pre-processor 130 fetches a virtual machine instruction from the instruction memory 120 via the bus 140.

Figure 1B:
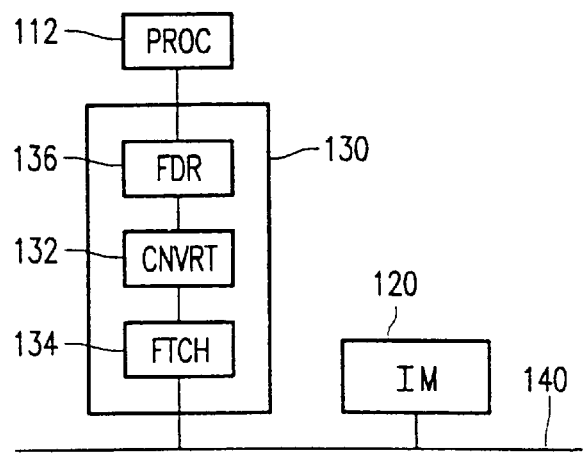
Figure 1C:
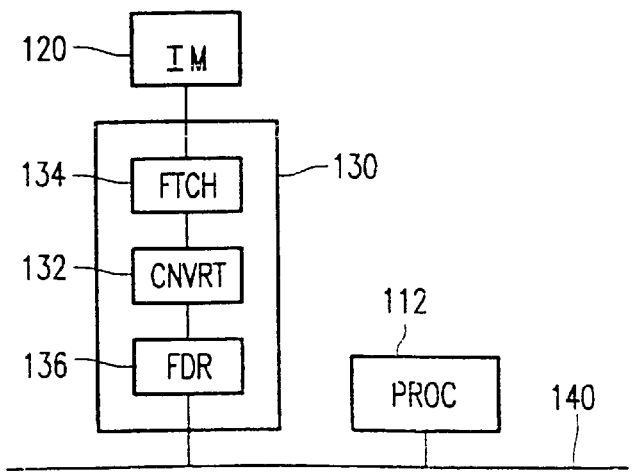

In FIGS. 1B and 1C, the pre-processor 130 is located in between the microcontroller 110 and the instruction memory 120. If the pre-processor 130 needs to distinguish between native and virtual machine instructions, these configurations may delay execution of native instructions stored in the instruction memory 120. For reasons of clarity not all elements shown in FIG. 1A are repeated in FIGS. 1B, 1C and 1D.

Figure 1D:
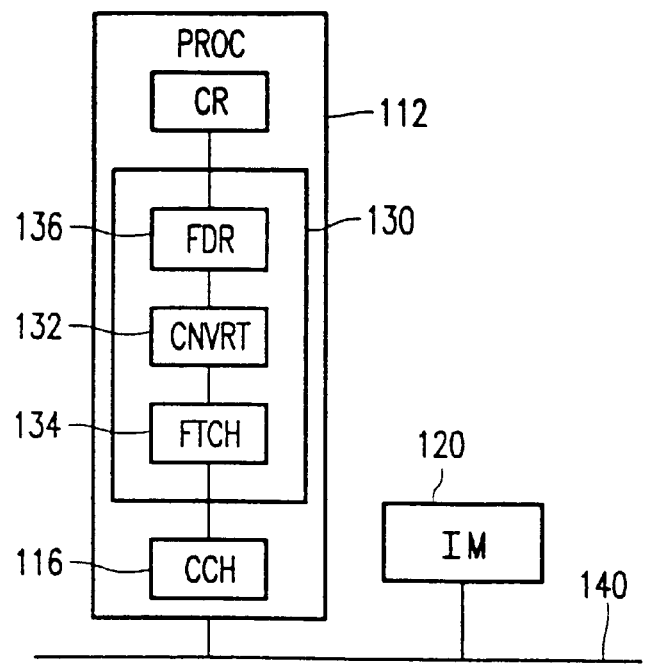

In FIG. 1D, the pre-processor 130 is embedded in the microcontroller 110. The pre-processor 130 is preferably located between an instruction cache 116 of the microcontroller 110 and the core 114. This configuration allows for optimal performance but, unlike the configurations of FIGS. 1A, 1B and 1C, requires changes to the microcontroller 110 and, as such, the pre-processor 130 can not as an off-the-shelf design be used for different types of microcontrollers.

The converter 132 is used for converting a virtual machine instruction, fetched from the instruction memory 120, into at least one native instruction. As an example, the Java byte code (a virtual machine instruction) for integer addition (0×60) results in adding the two top elements of the stack, removing the two top elements from the stack and pushing the sum on the stack. This virtual machine instruction may be converted to the following sequence of instructions (native instructions) for a MIPS processor (a 32-bits machine), where $tosp is a register pointing to the first empty location of the stack (above the top of stack):

| | |
|---|---|
| lw $a0, 4 ($tosp) | /* load the top element of the stack in register $a0 |
| lw $a1, 8 ($tosp) | /* load the second element of the stack in $a1 |
| add $a0, $a1, $a0 | /* add $a0 and $a1, place the sum in $a0 |
| addi $tosp, $tosp, 4 | /* lower the stack by one element |
| sw $a0, 4 ($tosp) | /* store the sum in the new top of stack |

Figure 2:
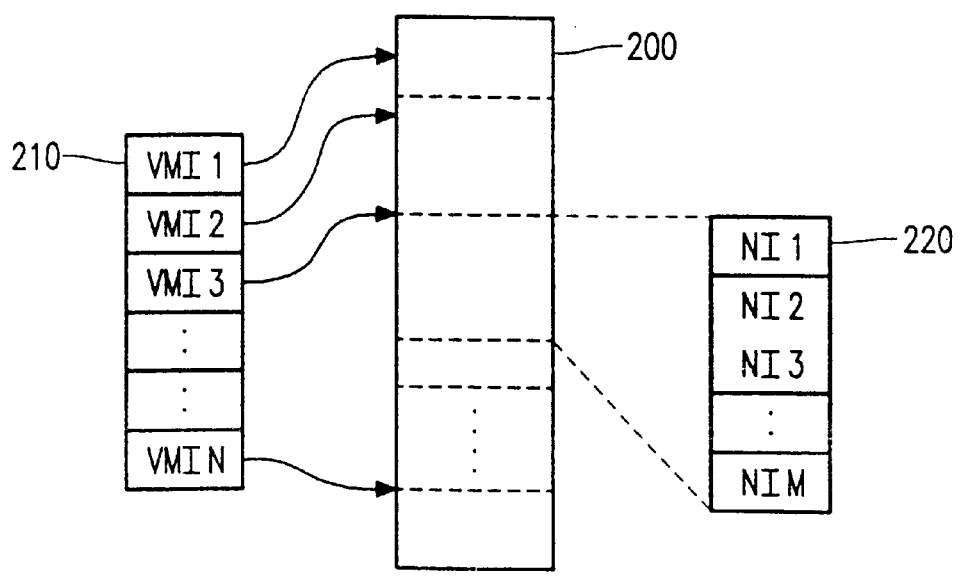
FIG. 2 shows a translation table for translating a virtual machine instruction into a sequence of native instructions.

Preferably, the converter 132 comprises a table for converting a virtual machine instruction to a sequence of native instructions. A one dimensional table may be used, where each cell of the table comprises a sequence of native instructions for one corresponding virtual machine instruction. The cell number may correspond to the value of the corresponding virtual machine instruction. As an example, the sequence of native instructions for the Java integer addition (0×60) may be located in cell 96 (=0×60 in hexadecimal notation). Since the length of the sequence of native instructions may vary considerably for the various virtual instructions, preferably the sequences are located in a one-dimensional table without any explicit cells where the sequences immediately follow each other. Such a translation table 200 is shown in FIG. 2, where the implicit cell boundaries are indicated using dotted lines. In order to be able to locate a sequence for a virtual machine instruction a code index table 210 may be used, which for each virtual machine instruction (VMI 1 to VMI N) indicates the starting point of the corresponding sequence in the translation table 200. For the cell of the translation table 200 which corresponds to VMI 3 the related sequence 220 of native instruction NI 1 to NI M are shown.

A further example of a conversion is given for the Java byte code bipush n (used for sign extending byte n and placing the result on top of the stack). This virtual machine instruction consists of two bytes {0×16 and n), where the first byte specifies the operation and the second byte provides the parameter n. The instruction may be converted to the following sequence of native MIPS instructions:

| | |
|---|---|
| ori $a0, $0, n | /* Load register $a0 with constant n */ |
| sll $a0, $a0, 24 | /* Shift left by 24 bits */ |
| sra $a0, $a0, 24 | /* Arithmetic shift right, causing sign extension, by |
| | /* replicating last left-most bit */ |
| sw $a0, 0 ($tosp) | /* Store result at new top of stack */ |
| addi $tosp, −4 | /* Increment stack size */ |

This example illustrates that a virtual machine instruction may be parameterised, where an operation code is followed by at least one operand. Advantageously, the converter 132 comprises a translation table 200, where native instructions are represented either by the full code or by an instruction skeleton. As an example, the instruction addi $tosp, −4 (last instruction of the sequence of the previous example) contains no variable parts and may be located in full as a 4-byte entry in the table. The instruction ori $a0, $0, n (first instruction of the sequence of the previous example) contains a variable part and may be located in the table as a skeleton, not specifying the variable part (being n). Preferably, the entry in the table for an instruction skeleton is the same width as a full instruction (e.g. 4-bytes for a MIPS processor), allowing a uniform table. Further information may be located in the table (or in separate table(s))

for indicating how the unspecified part of the native instruction skeleton should be filled in. Advantageously, microprogramming is used to fill in the unspecified parts. The further information may then comprise or indicate micro code. It will be appreciated that it is advantageous to use for an instruction skeleton a same structure (width and composition) as for a full native instruction. However, other structures may be used as well.

If the virtual machine is a stack oriented machine, preferably the stack or at least the top elements of the stack are mapped onto registers of the microcontroller 110. In this way the memory stack (with the virtual machine stack) is mapped to the register stack. Assuming that registers $r1, $r2 and $r3 contain three successive elements of the memory stack, where initially $r1 corresponds to the first empty location of the memory stack (above the top of the stack), $r2 contains the top of the memory stack, and $r3 contains the second element of the memory stack, the Java byte code bipush n may be converted to the following sequence of native MIPS instructions:

ori $r1, $0, n sll $r1, $r1, 24 sra $r1, $r1, 24

After this operation, $r1 contains the top of the memory stack. Similarly, the Java byte code (a virtual machine instruction) for integer addition (0×60) may be converted to the following sequence of MIPS instructions, starting from the same position where initially $r1 corresponds to the first empty location of the memory stack (above the top of the stack), $r2 contains the top of the memory stack, and $r3 contains the second element of the memory stack:

add $r3, $r2, $r3

After this operation, $r3 contains the top of the memory stack.

In above examples, preferably the position of the top of the memory stack (i.e. which register contains the top of the memory stack) is indicated using a register 138 of the converter 132. The converter uses the register 138, referred to as the Register Stack Pointer (RSP), to generate the appropriate native instructions. Preferably, microprogramming is used to specify the register operands of the native instructions. In this way also fixed native instructions have become variable, since the register operands need to be specified by the converter 132. Preferably, such operands are also stored in the translation table 200 using instruction skeletons. Assuming that RSP points to the first free register, the Java byte code bipush n may be converted to the following sequence of native MIPS instructions under control of the corresponding micro code:

| Micro code | Instructions |
| --- | --- |
| rsp -= 1; $f_{tg}$ = rsp + 1 | ori $(rsp + 1), $0, n |
| $f_{tg}$ = rsp + 1; $f_{ao}$ = rsp + 1 | sll $(rsp + 1), $(rsp + 1), 24 |
| $f_{tg}$ = rsp + 1; $f_{ao}$ = rsp + 1 | sra $(rsp + 1), $(rsp + 1), 2 | where $f_{tg}$ indicates the target register for the instruction, and $f_{a0}$ and $f_{a1}$ indicate the first and, respectively, second argument register for the instruction. A following Java byte code iadd for adding the two top elements of he stack would result in the following micro code and instruction:

$f_{tg}$=rsp+2; $f_{ao}$32 rsp+2; $f_{a1}$=rsp+1; rsp+=1 add $(rsp+2), $(rsp+2), $(rsp+1)

Figure 3:
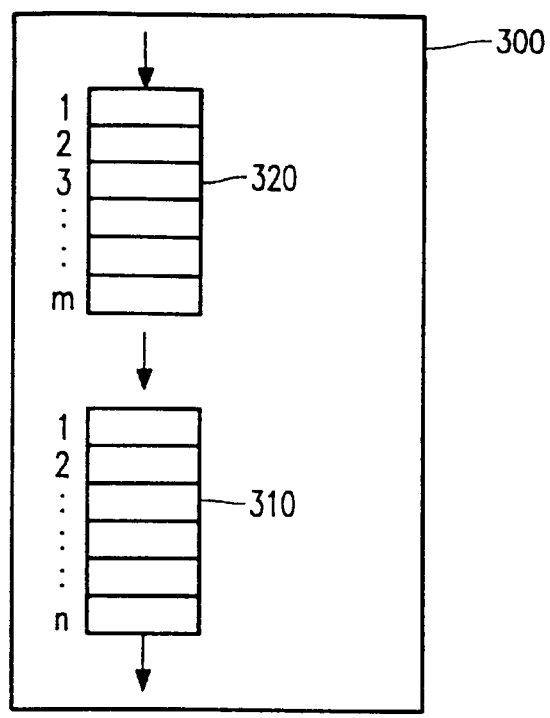
FIG. 3 shows a block diagram of an embodiment of the processing device wherein a feeding memory is used for re-feeding instructions.

FIG. 3 illustrates an embodiment according to the invention wherein the pre-processor 130 comprises a feeding memory 300. The feeding memory 300 comprises a part 310 for storing at least n instructions which were last fed to the processor (n being the maximum number of native instructions of which the processor could request re-feeding). In response to the processor 112 requesting re-feeding of a number of instructions, the feeding means 136 re-feeds the requested instructions from the feeding memory 300. Preferably, the feeding memory part 310 has a FIFO function 136. Each time an instruction is fed to the processor 112 for the first time, the instruction is loaded into the part 310 and, if the part 310 is full, the oldest instruction is removed. Advantageously, for a microcontroller with a k-stage pipeline n is equal to or larger than k. Similarly, for a processor with an instruction cache for storing up to h instructions n is equal to or larger than h. If both a k-stage pipeline and an instruction cache for storing up to h instructions, n is preferably equal to or larger than k+h.

In a further embodiment according to the invention, the feeding memory 300 comprises memory locations 320 for storing a further m native instructions, where m≧1. This allows the pre-processor 130 to generate up to m native instructions in advance for first time feeding to the processor and to store the additional instructions also in the feeding memory 300. Preferably, the part 320 of the feeding memory 300 has a FIFO function. Each time an instruction is fed to the processor 112 this instruction is removed from part 320 and inserted into part 310. The pre-processor 130 inserts the instructions in the part 320. Preferably the two memory parts 310 and 320 of the feeding memory 300 are be combined. This may be implemented using one unified FIFO. Other alternatives, such as cyclic buffers with corresponding pointer, may also be used.

Figure 4:
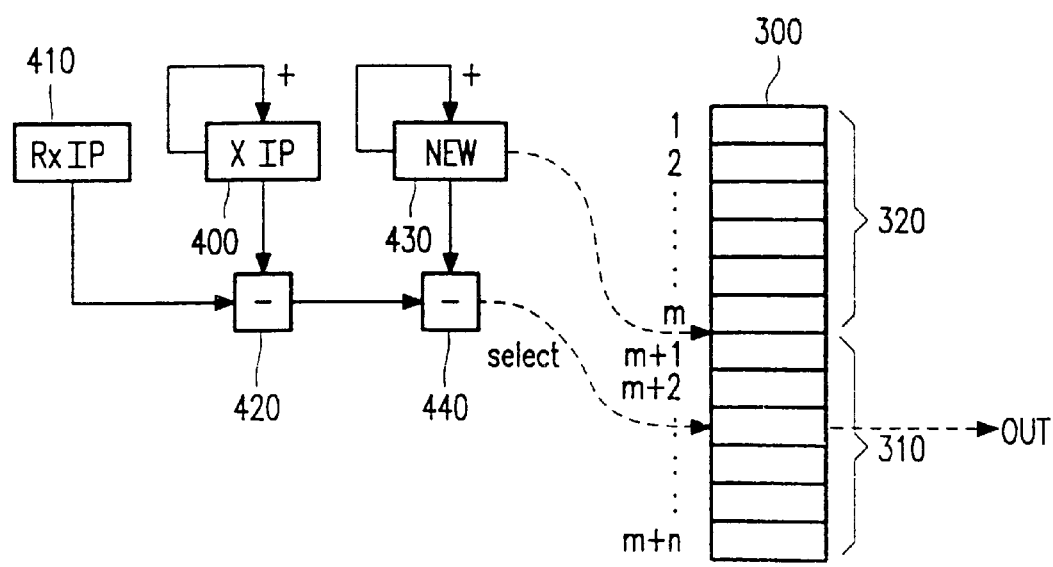
FIG. 4 illustrates a uniform way of feeding and re-feeding instructions.

In a further embodiment according to the invention a unified mechanism is used for first time feeding and re-feeding of native instructions from the feeding memory 300 to the processor 112. The feeding memory 300 stores instructions to be successively first-time fed (part 320) or re-fed (part 310) in a successive manner, as illustrated in FIG. 4. The pre-processor 130 comprises a counter 400 which indicates an address of a native instruction expected to be requested next by the processor for first time feeding. The counter 400 can be seen as the expected instruction pointer. The pre-processor 130 receives from the processor an actual instruction pointer 410 which indicates the actually requested native instruction. This may be the expected instruction, but may also be an already fed instruction. The pre-processor 130 comprises means to determine an offset of an actual address of an instruction (410) requested by the processor with respect to the address stored in the counter 400. Shown is a subtracter 420 for subtracting the expected and the received instruction pointer. If the received instruction pointer is subtracted from the expected instruction pointer, the outcome will range from 0 to n, where 0 indicates that the first new instruction is requested and the other values indicate a request for re-feeding. Based on the offset, the instruction is located in the feeding memory 300 and fed to the processor 112. Preferably the locating is performed by combining the offset with a value of a pointer to the feeding memory 300. Shown is a pointer 430 which indicates the first native instruction which has not yet been fed to the processor 112 (i.e. the instruction expected to be fed under normal circumstances). A subtracter 440 subtracts the offset from the value of the pointer 430. The resulting value points to the desired instruction. After the pre-processor 130 has compared the expected and the received instruction pointers the expected instruction pointer is normally set to the received instruction pointer+1 instruction (for a 4-byte instruction this may imply incrementing the counter 400 by 4). Depending on the arrangement chosen for the feeding memory 300 it may be required to increment the value of the pointer 430 by one each time an instruction is fed for the first time to the processor 112. If for instance a shift register is used for the feeding memory where a first time feeding of an instruction results in a shift, this is not required.

As an alternative to an alternative to the use of the feeding memory 300, the pre-processor 130 comprises storing means for storing a state of the pre-processor enabling to regenerate at least n instructions which were last fed to the processor. For instance, the pre-processor 130 could comprises a memory similar to the feeding memory 130 for storing pointers to the last fed n instructions or other state information allowing any of these instructions to be located or otherwise regenerated. The feeding means 136 is operative to, in response to the processor requesting re-feeding of a number of instructions, re-feeding the requested instructions by regenerating the instructions based on the stored state.

Advantageously, in a further embodiment the storing means is operative to store at least part of the state in an instruction pointer of the microcontroller. This can be simply performed by issuing a jump instruction to the microcontroller which set the instruction pointer to a value reflecting the part of the state. The feeding means 136 is operative to retrieve the stored part from the instruction pointer.

Figure 5:
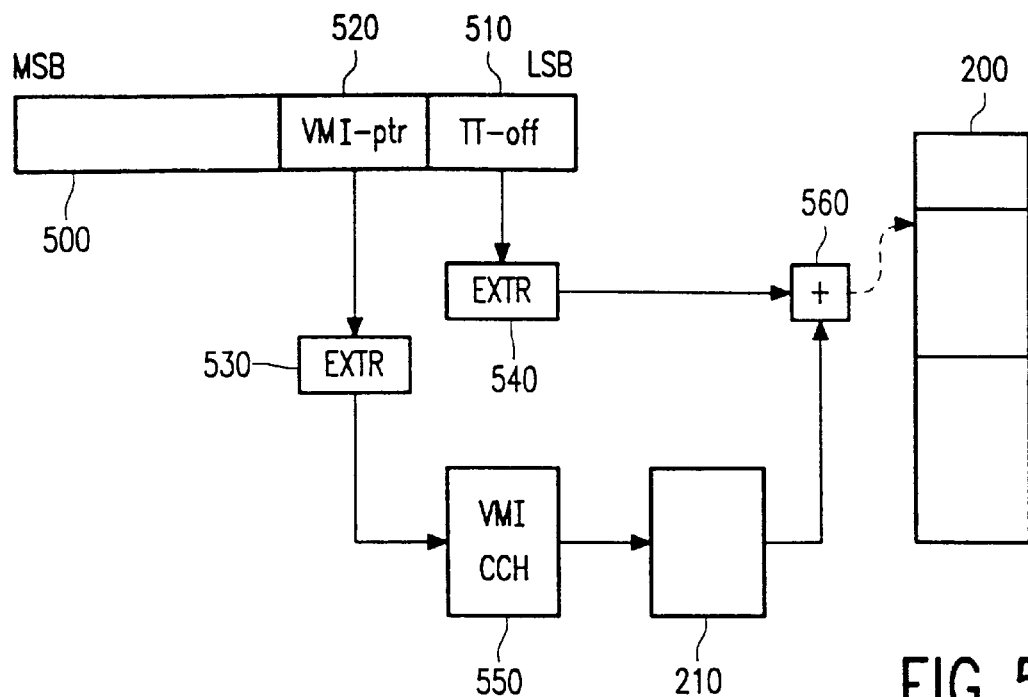
FIG. 5 illustrates using the instruction pointer of the processor as an index into the translation table.

FIG. 5 illustrates storing part of the state in the instruction pointer. The pre-processor 130 comprises for at least one virtual machine instruction a corresponding translation table for translating the virtual machine instruction into a sequence of native instructions. The translation table may, for instance, be stored in ROM. The translation table may be a cell 220 of the table described earlier and for which an example is shown in FIG. 2. In this alternative embodiment, the least significant part of the instruction pointer of the processor is used to indicate which of the native instructions (e.g. NI 1 to NI n) in the table is required (i.e. the least-significant part of the instruction pointer acts as a translation table offset indicator). This part may, for instance, be 5-bit wide, allowing for a maximum of 32 native instructions for a virtual machine instruction without using further measures. During normal operation, the processor 112 automatically increments the instruction pointer. Advantageously, the pre-processor 130 does not need to store an own counter, like counter 400, and increment this counter for indicating the native instruction expected to be read next. If the processor requests a re-feeding, the processor 112 will automatically set the instruction pointer to a previous value. In this way also re-feeding can be taken care of automatically. FIG. 5 shows a structure of the instruction pointer 500 of the processor 112, where the least significant part 510, starting at the least significant bit (LSB) is used for the translation table offset indicator. The pre-processor 130 comprises means 540 for extracting the translation table offset indicator 510 from the instruction pointer 500 (this may same involve an XOR operation on the instruction pointer 500 with a predetermined bit mask with '1'-bits at the position of the part 510 and '0'-bits for the other part(s). The extracted part may directly be used as a pointer into the translation table or used as an offset.

In a further embodiment, a predetermined further part 520 of the instruction pointer 500 comprises a virtual machine instruction pointer indicating a virtual machine instruction in the instruction memory 120. This virtual machine instruction pointer 520 can be seen as a virtual machine program counter, which needs to be incremented each time a new virtual machine instruction is required. If the pre-processor 130 is a memory mapped peripheral, one or more of the most significant bits of the instruction pointer 500 are reserved for indicating the address range reserved for the pre-processor 130. In principle, the remaining bits may be used for the part 520. Preferably this part is at least 16 bit wide, allowing for 64 KB blocks of virtual machine program. Also the Register Stack Pointer 138 of FIG. 1A may be encoded in the instruction pointer, eliminating the need for the pre-processor 130 to maintain this pointer.

The pre-processor 130 comprises means 530 for extracting the virtual machine instruction pointer 520 from the instruction pointer 500. The pre-processor 130 fetches the virtual machine instruction indicated by the extracted virtual machine instruction pointer from the instruction memory 120. Based on the fetched virtual machine instruction the pre-processor 130 locates the translation table. The least significant part 510 of the instruction pointer 500 of the processor is then used as an offset in the translation table. Means 540 are used for extracting the least significant part 510 from the instruction pointer 500. Preferably, the translation tables for the respective virtual machine instructions are combined into one sequential table, where a cell is reserved for native instructions corresponding to one virtual machine instruction. Such a table has been described before and an example 200 has also been shown in FIG. 2. An index table 210, as described earlier, may be used for locating the relevant part of the translation table 200 for each virtual machine instruction. Adding means 560 may be used for adding the output of the index table 200 (i.e. a cell address of the translation table 200) to the translation table offset (output of the extracting means 540). Advantageously, the pre-processor 130 comprises a cache 550 for storing already fetched or expected to be fetched virtual machine instructions from the instruction memory 120. Whenever a sequence of native instructions relating to one virtual machine instruction has been completed, the virtual machine instruction pointer can be set to indicate the next virtual machine instruction, for instance, by using as a last native instruction in the sequence an explicit jump which sets the virtual machine instruction pointer to the desired value and resets the translation offset part of the instruction pointer. Advantageously, the part 520 of the instruction pointer is the next higher part in significance compared to the part 510. In this way, the virtual machine instruction pointer can also be incremented by using one or more NOP (no operation) instructions so that eventually an overflow of the translation offset part 510 results in the processor 112 incrementing the virtual machine instruction pointer. Depending on the processor, it may be faster to execute one or more NOP instructions than a jump. It will be appreciated that it is not required that each request from the processor 112 for a native instruction results in the pre-processor 130 fetching a virtual machine instruction from the instruction memory 120.

Figure 6:
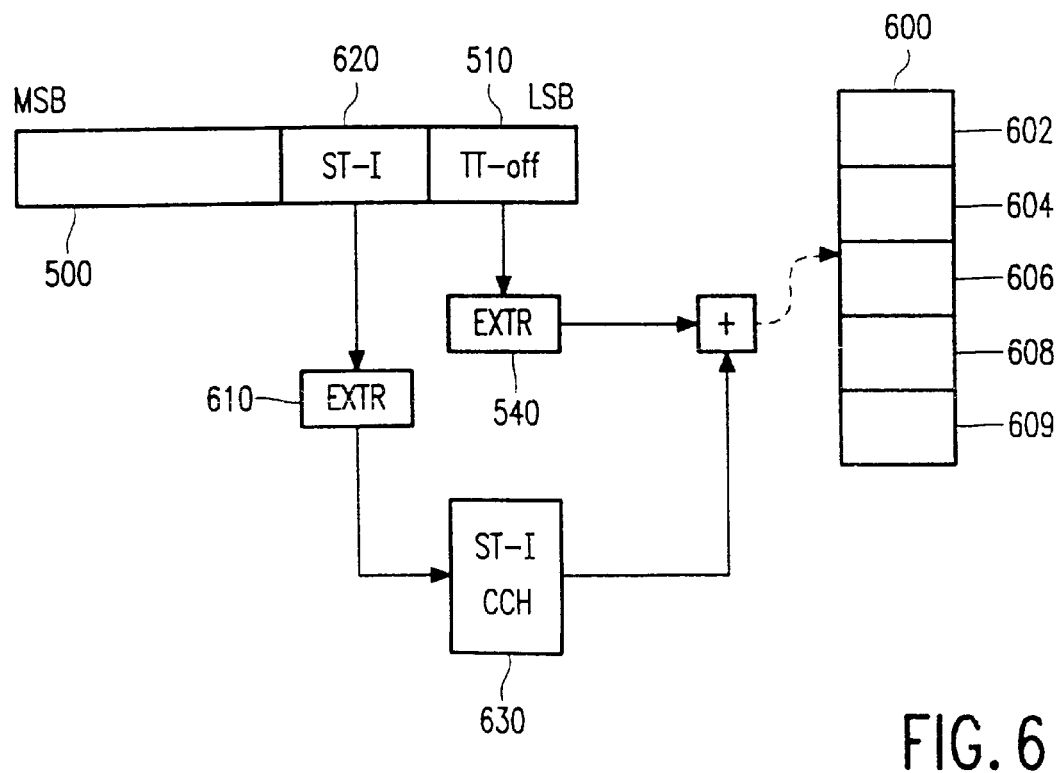
FIG. 6 shows an alternative use of the instruction pointer.

In an alternative embodiment shown in FIG. 6, the translation table 600 is divided into several sub-tables; shown are sub-tables 602, 604, 606, 608, and 609. Each sub-table comprises at least one native instruction or native instruction skeleton, where at least one of the sub-tables comprises a sequence of native instructions or native instruction skeletons. Advantageously, a sequence of native instructions for a virtual machine instruction starts at the first entry of a sub-table. The sub-table may, but does not need to, correspond to a complete sequence of native instructions corresponding to one virtual machine instruction. The sub-table may be shorter than the sequence, in which case it is preferred that the sequence continues in the sequentially next sub-table. In practice it may be preferred to choose a sub-table size of only 4 or 8 native instructions, which may be less than the maximum sequence of native instructions for a virtual machine instruction. The translation table offset indicator 510 indicates an offset in one of the sub-tables. A predetermined further part 620 of the instruction pointer 500 comprises a sub-table indicator. The pre-processor 130 uses the value of the sub-table indicator 620 to locate the actually involved sub-table. To this end, the pre-processor 130 comprises means 610 for extracting the sub-table indicator 620 from the instruction pointer 500. Preferably, in normal operation the sub-table indicator is incremented by one unit each time a native instruction is fetched from a next sub-table (regardless of the sub-table being related to the same or different virtual machine instructions). As an example, assume that the sequence of a first virtual machine instruction is stored in the successive sub-tables with respective sub-table numbers of 110, 111, and 112; that the next virtual machine instruction is stored in sub-tables 85 and 86, and that a third virtual machine instruction is stored in sub-tables 41 and 42. If the sub-table size is 4 entries (using a 2-bit translation table offset indicator 510), the first series of four native instructions (of sub-table with number 110) may be indicated by, for instance, a sub-table indicator 620 value of 1, where the translation table offset indicators runs from 0 to 3. The second series of four native instructions (of sub-table with number 111) will then be indicated by a sub-table indicator 620 value of 2. The third series will be indicated by a sub-table indicator 620 value of 3. The fourth series (although relating to a different virtual machine instruction) will be indicated by the next value of the sub-table indicator 620, being 4. Advantageously, the pre-processor 130 comprises a cache 630 for storing pointers to the related sub-table(s) for the last used sub-table indicators. In this example, the cache would store:

| sub-table indicator | sub-table number |
|---|---|
| 1 | 110 |
| 2 | 111 |
| 3 | 112 |
| 4 | 85 |

Preferably, the sub-tables have equal size. If so, for the purpose of re-feeding, an instruction can be located by, based on the sub-table indicator 620, locating the sub-table number in the cache 630, multiplying the sub-table number by the size, and adding the translation table offset 510. Advantageously, the sub-tables have an equal size which is a power of 2. By using a translation table offset indicator 510 with a corresponding length (a k-bit indicator corresponds to a sub-table size of $2^k$), the sub-table indicator will be incremented automatically (as a result of an overflow of the translation table offset indicator 510) each time all instructions of a sub-table have been dealt with. At the end of a sequence of native instructions for one virtual machine instruction, additional NOP instruction(s) may be used to complement the sequence to end at the boundary of the sub-table. In this way, the sub-table indicator 620 will also be automatically incremented to a correct value for successive sequences of instructions. Alternatively a jump instruction may be used, which resets the translation table offset indicator 510 and increments the sub-table indicator 620. For variable size sub-tables, a separate index table, similar to table 210, may be used for locating the starting address of a sub-table based on the sub-table number.. In practice it may be possible to use a very small sub-table indicator 620. For a processor which requests re-feeding of up to 16 instructions and using sub-tables with 4 entries, it is sufficient to use a 2-bit sub-table indicator 620. In this example, the cache 630 only needs to have 4 entries.

It will be appreciated that for the sub-table indicator 620 also the actual sub-table number may be used. In this case, however, jumps are required to set the sub-table indicator 620 to the correct value, for instance if a different sequence is started. Also the size of the sub-table indicator 620 will have to be larger, to be able to represent all sub-table numbers. Using such an arrangement, the combination of the sub-table indicator 620 and the translation table offset indicator 510 can directly indicate an entry in the table 600, making the cache 630 redundant.

In a further embodiment according to the invention, the microcontroller 110 comprises the instruction memory 120 and the pre-processor 130. The processor 112, the instruction memory 120 and the pre-processor 130 being coupled via an atomic-transaction microcontroller bus 140. With an atomic transaction bus is meant a bus on which a device in order to perform a read operation, such as fetching an instruction, performs the following sequence of steps:
the device obtains exclusive access to the bus,
the device requests data (such as an instruction) by putting a request on the bus,
the device obtains the data when another device has put the data on the bus,
the device releases the bus, allowing other devices access to the bus.

The processor 112 requests (re-)feeding of native instructions via the bus 140 . The pre-processor 130 fetches virtual machine instructions from the instruction memory 120 also via the bus 140 for conversion to associated native instruction(s). Without special precautions, a deadlock can occur if the processor 112 has requested a native instruction and blocks the bus 140 until the instruction has been supplied, whereas the pre-processor 130 first needs to obtain a (virtual machine) instruction from the instruction memory 120 via the same bus 140 before it can supply the native instruction. To avoid such a situation, the pre-processor 130 comprises means for, in response to the processor 112 requesting (re-)feeding of a native instruction whose associated virtual machine instruction is not or no longer present in the pre-processor 130, feeding a no-operation (NOP) instruction to the processor 112 completing the bus transaction initiated by the processor 112.

Advantageously, the processing device 100 is capable of executing virtual machine instructions of more than one program. For instance, the processing device 100 supports a plurality of tasks expressed in virtual machine instructions. Optionally, some of the tasks may also be expressed in native instructions. Preferably, the support for multiple virtual machine tasks is implemented by a task switching routine in the operating system running on the microcontroller 110. When a task switch is triggered (e.g. driven by a timer interrupt and handled by a task switching interrupt handling routine), information relevant for the currently active task is saved from the pre-processor 130 in addition to saving information from the processor 112. The information may be saved in a memory. The same type information is reloaded for the new task and provided to the pre-processor 130 and the processor 112. In the embodiments shown in FIGS. 3 and 4, the relevant pre-processor information includes the contents of the feeding memory 300, the counter 400 and the pointer 430. In the embodiments shown in FIGS. 5 and 6, the relevant pre-processor information includes the contents of the cache 550 and 630, respectively. To enable saving and restoring the information, the relevant elements of the pre-processor 130 are of a type which can be read and set under control of the processor 112. It will be appreciated that as an alternative the cache 550 may be saved and restored by the pre-processor 130.

What is claimed is:

1. A processing device for executing virtual machine instructions; the processing device comprising:
    an instruction memory for storing instructions including at least one of the virtual machine instructions;
    a microcontroller including a microcontroller core for executing native instructions from a predetermined set of microcontroller specific instructions; the native instructions being different from the virtual machine instructions; and
    a pre-processor including a converter for converting at least one virtual machine instruction, fetched from the instruction memory into at least one native instruction, and feeding means for feeding native instructions to the microcontroller core for execution,
    wherein after the occurrence of a predetermined condition, the microprocessor requests re-feeding of up to a predetermined maximum of n native instructions, where n>1, and the feeding means re-feeds the requested native instructions.

2. A processing device as claimed in claim 1, wherein the pre-processor comprises a feeding memory for storing at least n instructions which were last fed to the processor; and
    in that the feeding means is operative to, in response to the microcontroller requesting re-feeding of a number of instructions, re-feeding the requested instructions from the feeding memory.

3. A processing device as claimed in claim 2, wherein the microcontroller is of a pipelined architecture, with a k-stage pipeline and n is equal to or larger than k.

4. A processing device as claimed in claim 2, wherein the microcontroller includes an instruction cache for storing up to h instructions and n is equal to or larger than h.

5. A processing device as claimed in claim 2, wherein the microcontroller is of a pipelined architecture, with a k-stage pipeline, and includes an instruction cache for storing up to h instructions; and n is equal to or larger than k+h.

6. A processing device as claimed in claim 2, wherein the feeding memory comprises locations for storing at least n+m native instructions, where m□1 and the pre-processor is operative to generate and store in the feeding memory up to m native instructions for first-time feeding to the microcontroller.

7. A processing device as claimed in claim 6, wherein instructions to be successively fed or re-fed to the processor are stored successively; and the pre-processor comprises:
    a counter indicating an address of an instruction expected to be requested next by the processor for first time feeding;
    means to determine an offset of an actual address of an instruction requested by the microcontroller with respect to the address stored in the counter; and
    based on the offset locating the requested instruction in the feeding memory.

8. A processing device as claimed in claim 1, wherein the pre-processor comprises storing means for storing a state of the pre-processor enabling to regenerate at least n instructions which were last fed to the processor; and
    in that the feeding means is operative to, in response to the microcontroller requesting re-feeding of a number of instructions, re-feeding the requested instructions by regenerating the instructions based on the stored state.

9. A processing device as claimed in claim 8, wherein the storing means is operative to store at least part of the state in an instruction pointer of the microcontroller; and in that the feeding means is operative to retrieve the stored part from the instruction pointer.

10. A processing device as claimed in claim 9, wherein the pre-processor comprises for at least one virtual machine instruction a corresponding translation table for translating the virtual machine instruction into a sequence of native instructions; the table comprising native instructions and/or native instruction skeletons; in that the state comprises a translation table offset indicator; and in that the storing means is operative to store the translation table offset indicator in a predetermined least-significant part of the instruction pointer of the microcontroller; and in that the feeding means is operative to locate a native instruction or a native instruction skeleton in the translation table under control of the translation table offset indicator in the instruction pointer.

11. A processing device as claimed in claim 10, wherein the state further comprises a virtual machine instruction pointer indicating a virtual machine instruction in the instruction memory; and in that the storing means is operative to store the virtual machine instruction pointer in a predetermined further part of the instruction pointer of the microcontroller; and in that the pre-processor comprises means for fetching a virtual machine instruction from a location in the instruction memory indicated by the virtual machine instruction pointer in the instruction pointer of the microcontroller, and in that the feeding means is operative to locate the translation table corresponding to the fetched virtual machine instruction.

12. A processing device as claimed in claim 10, wherein:
    the translation table is divided into a plurality of sub-tables, at least one of the sub-tables comprising a sequence of native instructions or native instruction skeletons;
    in that the translation table offset indicator indicates an offset in a sub-table;
    in that the state further comprises a sub-table indicator; and in that the storing means is operative to store the sub-table indicator in a predetermined further part of the instruction pointer of the microcontroller;
    and in that the feeding means is operative to locate a native instruction or native instruction skeleton at a location in the sub-table indicated by the sub-table indicator of the instruction pointer and the translation table offset indicator of the instruction pointer.

13. A processing device as claimed in claim 1, wherein the microcontroller comprises the instruction memory and the pre-processor and being coupled via an atomic-transaction microcontroller bus; the microcontroller being capable of requesting feeding of a native instruction via the bus and the pre-processor being operative to fetch a virtual machine instruction from the instruction memory via the bus for conversion to at least one associated native instruction; and wherein the pre-processor comprises means for, in response to a request, refeeding of a native instruction whose associated virtual machine instruction is not or no longer present in the pre-processor, and feeding a no-operation (NOP) instruction when completing the bus transaction.

14. A pre-processor for use with a microcontroller core capable of executing native instructions from a predetermined set of microcontroller specific instructions, the pre-processor comprising:

a converter for converting at least one virtual machine instruction, fetched from an instruction memory, into at least one native instruction; the native instructions being different from the virtual machine instructions; and feeding means for feeding native instructions to the microcontroller core for execution the feeding means including means for, in response to a request for re-feeding of more than one native instruction, re-feeding the requested native instructions.

* * * * *